United States Patent [19]

Advani et al.

[11] Patent Number: 4,498,142
[45] Date of Patent: Feb. 5, 1985

[54] METHOD FOR UPDATING A PROGRAM ON A COMBINED PROGRAM DISKETTE IN AN INTERACTIVE TEXT PROCESSING SYSTEM

[75] Inventors: Hira Advani; William C. Cason, both of Austin, Tex.

[73] Assignee: International Business Machines Corporation, Armonk, N.Y.

[21] Appl. No.: 311,113

[22] Filed: Oct. 13, 1981

[51] Int. Cl.³ .............................................. G06F 7/24
[52] U.S. Cl. ..................................................... 364/900
[58] Field of Search ............... 360/13, 15, 91; 369/30, 369/83, 84; 364/200 MS File, 900 MS File

[56] References Cited

U.S. PATENT DOCUMENTS

| | | | |
|---|---|---|---|
| 4,103,334 | 7/1978 | Kashio | 364/900 |
| 4,122,500 | 10/1978 | Bradford et al. | 360/13 |
| 4,283,745 | 8/1981 | Kuper et al. | 360/13 |
| 4,296,476 | 10/1981 | Mayer et al. | 364/900 |

Primary Examiner—Thomas M. Heckler
Attorney, Agent, or Firm—Richard E. Cummins

[57] ABSTRACT

A method to assist the operator of an interactive text processing system to update program modules associated with one of a plurality of text processing programs that have been combined on a two-sided, double-density (2S2D) combined program/work diskette. The method involves creating a new 2S2D combined program/work diskette by transferring the programming modules and other data from the old 2S2D combined program/work diskette so that the transferred programming modules assigned to each data set are recorded in module number order after each data set directory and the data set directories are also recorded in sequential order, and replacing a program module on the new 2S2D combined program/work diskette with a corresponding module from the 1S1D diskette containing the updated programs whenever the "build number" of the corresponding module on the 2S2D diskette is lower than the module on the 1S1D diskette.

4 Claims, 6 Drawing Figures

| 0 | LENGTH OF DIRECTORY (IN BYTES) | MAX. MODULE # FOR DATA | RESERVED | RESERVED | RESERVED |
|---|---|---|---|---|---|
| 6 | ATTRIBUTES OF MODULE 1 | LENGTH OF MODULE 1 (IN BYTES) | | PHYSICAL BLOCK NUMBER OF MODULE 1 | |
| 12 | — — — — — — — — — — — — — — — — | | | | |
| 762 | ATTRIBUTES OF MODULE 127 | LENGTH OF MODULE 127 (IN BYTES) | | PHYSICAL BLOCK NUMBER OF MODULE 127 | |
| 768 | BUILD NUMBER OF MODULE 1 | BUILD NUMBER OF MODULE 2 | | BUILD NUMBER OF MODULE 3 | |
| 774 | BUILD NUMBER OF MODULE 4 | BUILD NUMBER OF MODULE 5 | | BUILD NUMBER OF MODULE 6 | |
|  | — — — — — — — — — — — — | | | | |
| 1018 | BUILD NUMBER OF MODULE 126 | BUILD NUMBER OF MODULE 127 | | RESERVED | |
| 1024 | | | | | |

FIG. 5

METHOD FOR UPDATING A PROGRAM ON A COMBINED PROGRAM DISKETTE IN AN INTERACTIVE TEXT PROCESSING SYSTEM

BACKGROUND OF THE INVENTION

This invention relates in general to interactive text processing systems and, in particular, to an improved method for replacing one of a plurality of programs stored on combined program/work diskette with an updated version of the program stored on a 1S1D program diskette.

RELATED APPLICATIONS

Ser. No. 311,083, is directed to an improved method for creating a single two-sided, double-density (2S2D) combined program diskette by interactively selecting individual programs that are stored on a plurality of one-sided, single-density (1S1D) program diskettes.

Ser. No. 311,088, is directed to an improved method for dynamically creating one or more menus for storage on the 2S2D combined program diskette during the creation of that diskette which are displayed as valid selectable options to the operator when the text processing system is operated with the combined program diskette.

DESCRIPTION OF PRIOR ART

The prior art has disclosed a number of interactive text or word processing systems. Generally these systems comprise a display device, a keyboard, a microprocessor, a printer, and one or more diskette drives. The function of the diskette drive is to transfer to the volatile memory of the microprocessor one or more programs which interrelate the various hardware components of the system and which permit one or more text processing applications to be run on the system.

Some systems include a modem device for communicating with other word processing or even data processing systems. Most systems provide the operator with a displayed "menu" from which one or more selections can be indicated by the operator merely by typing a character or symbol on the keyboard and activating an "enter" key. Depending on the character entered into the system, the microprocessor may display a further "menu". The process is repeated until all of the data required by the system to perform a desired text processing task has been entered into the system.

One part of the program which has been entered into the system from the diskette is concerned primarily with establishing the normal interaction of the various components of the system. For example, a subroutine will normally provide for taking the signals represented by a single keystroke and transferring that byte of data to the microprocessor. Another subroutine will cause the character to be displayed on the screen at a location specified by the display cursor. Subroutines and programs which provide such functions are generally referred to as system control programs, whereas the programs that are unique to a particular text processing application, such as the creation of a document, are referred to as application programs.

As basic text processing systems have become more widespread and the number of installations have increased, the ability to economically support new application programs directed to features which enhance the basic program have improved to the point that for most text processing systems that are presently installed, a large number of different feature programs language dictionaries and options are available and new feature programs and dictionaries become available on a regular basis.

The manner in which these new feature programs are introduced into the marketplace and the manner in which updates to existing programs reflecting corrections are handled, result in an increase in the amount of diskette handling required by the operator and is the cause for concern that errors will occur and efficiency will decrease in proportion to the number of diskettes that are required. In addition, the proliferation of feature diskettes and language dictionary diskettes add to the level of confusion for the unskilled operator.

The problem originates primarily in the system hardware because most early systems had a diskette drive that operated with a diskette cartridge which recorded on only one side of a disk. Subsequently, diskette drives and cartridges were marketed in which the amount of data stored on one side of the diskette was doubled. More recently, diskette drives and cartridges have been marketed in which both sides of the diskette are recorded at a double density, resulting in a storage capacity approximately four times the capacity of the original diskette.

Since each new feature program is generally separately priced, the industry has found it expedient to record only one feature program on a diskette along with the necessary control program for getting the program into the system to display its various menus, etc, and to interact with the basic text processing program.

The result is that the operator is presented with one diskette for each feature and where the text processing task being run by the operator utilizes a number of these features, considerable time is spent by the operator in changing diskettes. For example, assume in addition to the basic text processing program, the operator is provided with three additional feature programs on three separate diskettes. Assume for example that one program provides the communication function to be done by the operator interactively with the system. That feature provides the ability to communicate with another terminal specified by the operator. Another diskette contains a program for recording the typed text on magnetic cards which then can be played out on magnetic card typewriters. The third diskette contains the third feature program which allows the operator to establish data processing type files, such as a name and address lists.

If the memory of the microprocessor was capable of storing all the data on the three diskettes, then there would be no major problem. However, this is technically not economical in that volatile memories which operate at the speed of the microprocessors in reading and writing data are currently much too expensive for the amount of data that must be stored. The operator is, therefore, faced with the problem of changing programming diskettes as the various program applications are required in any text processing application that is being run. The problem becomes even more complex when the system has only one diskette drive which must share the work diskette with the program diskette.

The invention described and claimed in related application Ser. No. 311,083 is directed to a method to reduce the amount of diskette handling by the operator by creating one new diskette which combines the programming and other data desired by the operator from a number of separate diskettes.

The method involved in creating a combined program diskette starts with the step of displaying to the operator a menu which reflects all processing tasks that the system is capable of performing. The menu is displayed as a result of reading an IPL program into the system along with a "combine" program which displays the menu and which guides the operator through a series of diskette insertions and removals. Depending on the various processing tasks that the operator selects from the menu, programs are transferred to the 2S2D destination diskette from the 1S1D source diskette. In addition to transferring the specific task programs from the various source diskettes to the destination diskette, information that had previously been entered into the system by the operator and stored on the individual source diskettes, for example, format and setup information on certain type documents, may also be transferred to the 2S2D destination diskette from the 1S1D source diskettes.

The number of diskette changes required by an operator of an interactive text processing system using a combined program diskette is reduced considerably. Details of that system may be found in the referenced related copending application which for completeness is incorporated herein by reference.

As will be understood by persons familiar with the systems that operate from computer programs, it is not uncommon for a program that has been released to customers to be updated at some subsequent time. The reasons for these updated versions include correcting minor errors, providing improved performance, and increased function. When a new version of a program for an interactive text processing system of the type disclosed in the cross-referenced application is provided, the operator will generally substitute the new diskette and discard the earlier version after transferring any setup or other information that has been stored on the earlier version to the new version. However, a problem exists when a program that has been updated has the original version stored on a combined program 2S2D diskette. The operator must then create a new combined program diskette each time one of the programs is updated. This problem is further complicated when the original 1S1D program diskettes included individual programs which could be transferred to the combined program diskette such as occurs with the spelling check programs in various languages. The updated version of the spelling check program diskette, when distributed, will not necessarily identify what specific program was updated. As a result, the necessity of creating a new combined diskette depends on whether the part of the updated program is stored on the 2S2D combined diskette. The creation of a new combined program diskette that is precisely the same as the previous one except for the update to the one program which prompted the release of the update will be a very tedious task if all of the various steps have to be repeated since the combined program diskette includes setup information, supplementary dictionaries, etc. for which no current audit trail exists as to the source diskettes.

The present invention avoids those problems by providing a method whereby the interactive text processing system may interactively update the combined program diskette directly from the 1S1D diskette containing the updated program.

It is, therefore, an object of the present invention to provide a method for an interactive text processing system to update a combined program diskette directly from a program disk containing an updated version of a program stored on the combined programming diskette.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 illustrates a data set directory for a program stored on the 1S1D diskette which contains the updated modules;

DESCRIPTION OF THE PREFERRED EMBODIMENT

Figure 1:
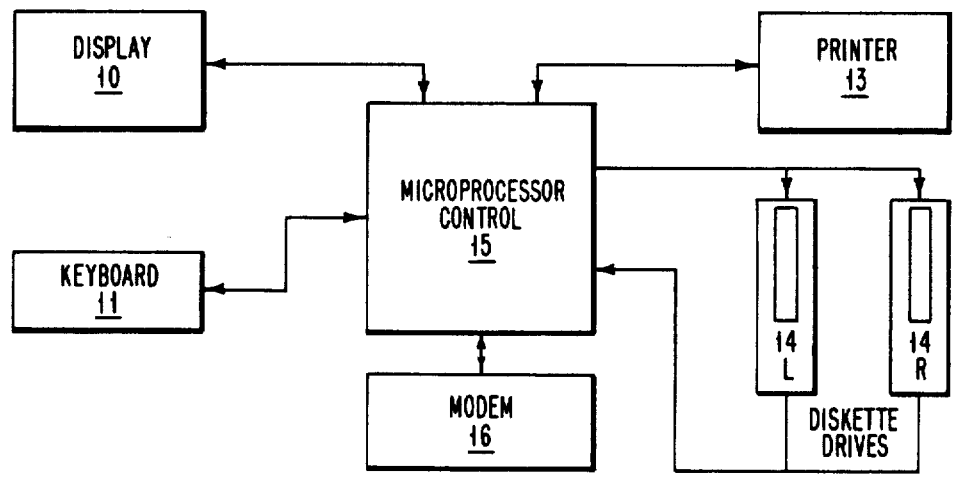
FIG. 1 is a functional block diagram of an interactive text processing system in which the method of the present invention may be employed.

With reference to FIG. 1, a typical interactive text processing system is illustrated in which the method of the present invention is advantageously employed. The major components of the system shown in FIG. 1 comprise the display device 10, the keyboard 11, the printer 13, the diskette storage devices 14L and 14R, and the microprocessor 15 which includes an internal memory for storing programs and data entered from the keyboard 11 or from the diskette storage devices 14L and 14R. Device 14 functions to store data on either a single-sided diskette at density D1 only or to store data on a two-sided diskette at double density D2. The 2S2D diskette, therefore, can store approximately four times the information stored on the 1S1D diskette. A modem 16 is also shown in FIG. 1 and functions to permit the system to communicate with other similar text processing systems or to a data processing system.

Figure 2:
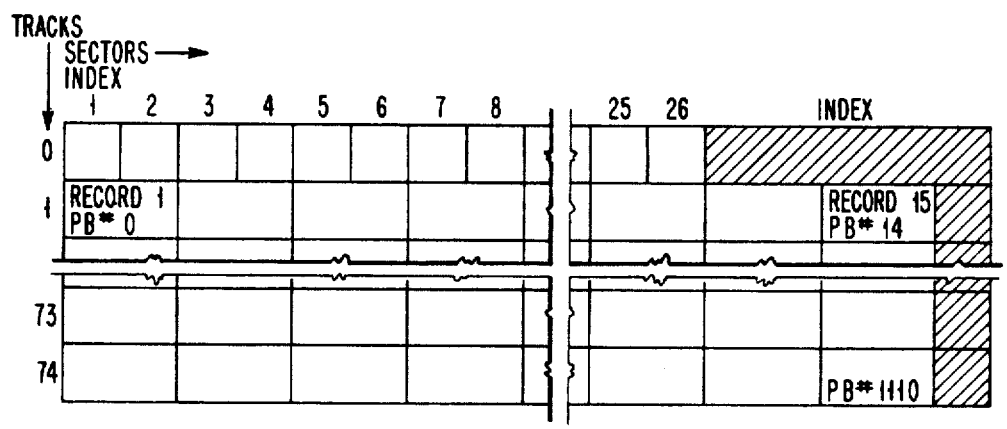
FIG. 2 is a table illustrating the general layout of diskettes employed in the system shown in FIG. 1.
Figure 3:
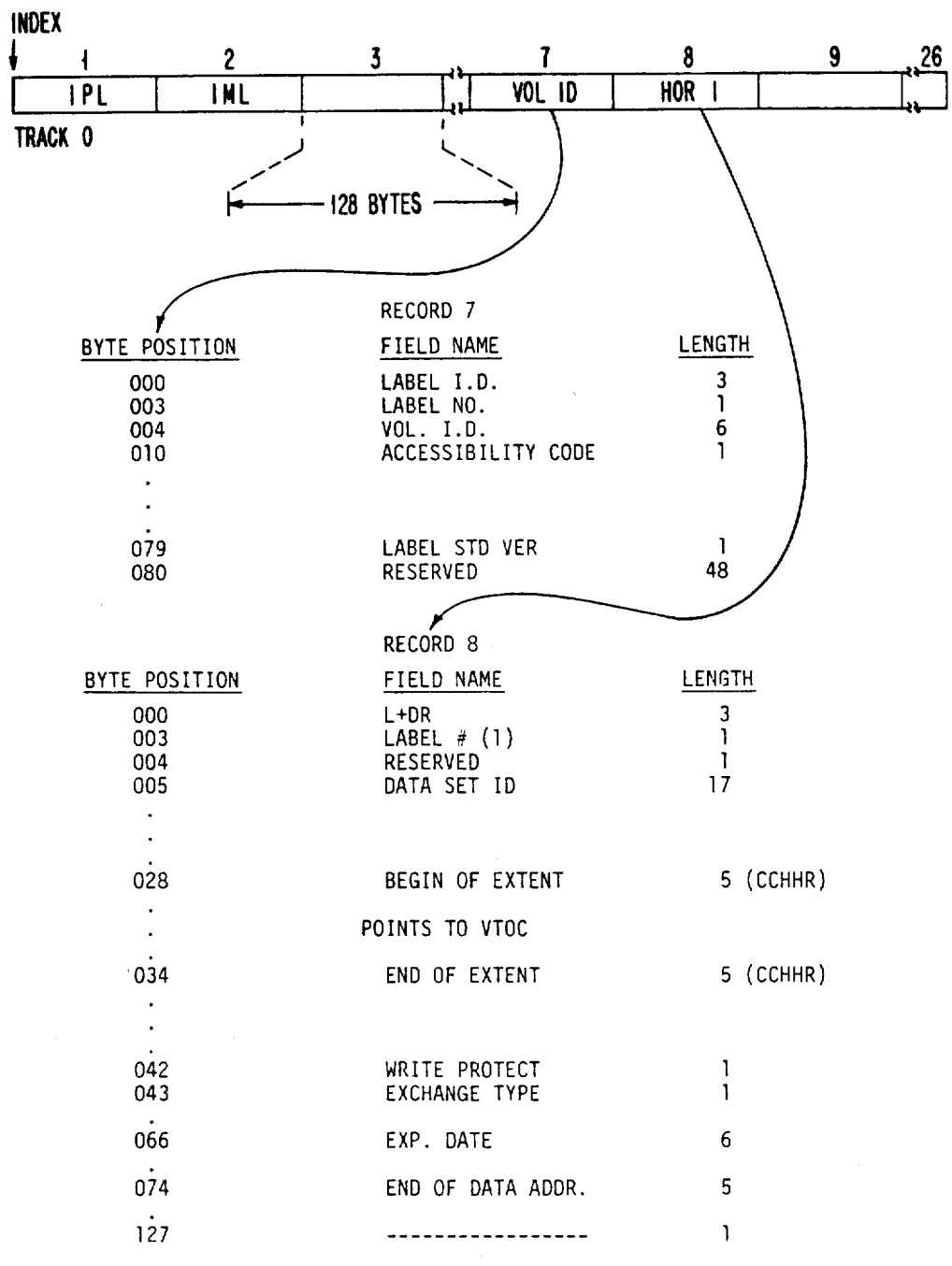
FIG. 3 illustrates the format of track 0 of the diskette shown in FIG. 2.

The general format on both types of diskettes is standard for a given system manufacturer to insure data interchange among like systems and is shown in FIG. 2. The IBM Standard for Word Processing Diskettes published by the IBM Corporation, Armonk, N.Y. under the title Diskette 1, 2 and 2D OEMI Manual, publication number G-A-21-9388, provides a very detailed description of the format. According to that standard, each diskette is provided with tracks labelled 0 through 74. Tracks 1 through 74 are available for user data. Track 0 is reserved for system use, while two tracks, 75 and 76, are available as alternates and normally are not used. As shown in FIG. 2, physical records 1 and 2 of track 0, corresponding to sectors 1 and 2, are reserved for the Initial Program Load (IPL) and the Initial Microcode Load (IML) functions. Record 7 on track 0 is the volume 1 label, while records 8-26 are reserved for data set header labels. Record 8 is a standard header label and, as shown in FIG. 3, includes bytes 28-32 representing a 5-character field defining the beginning address of the volume table of contents (VTOC). The beginning address field is formatted as a 2-byte cylinder field, a 2-byte head number, and a 1-byte record number referred to generally in the art as the CCHHR addresses. The end of VTOC is defined by another 5-character field CCHHR in bytes 34 through 38 of record 8 of track 0. The format of track 0 is the accepted standard for diskettes.

Figure 4:
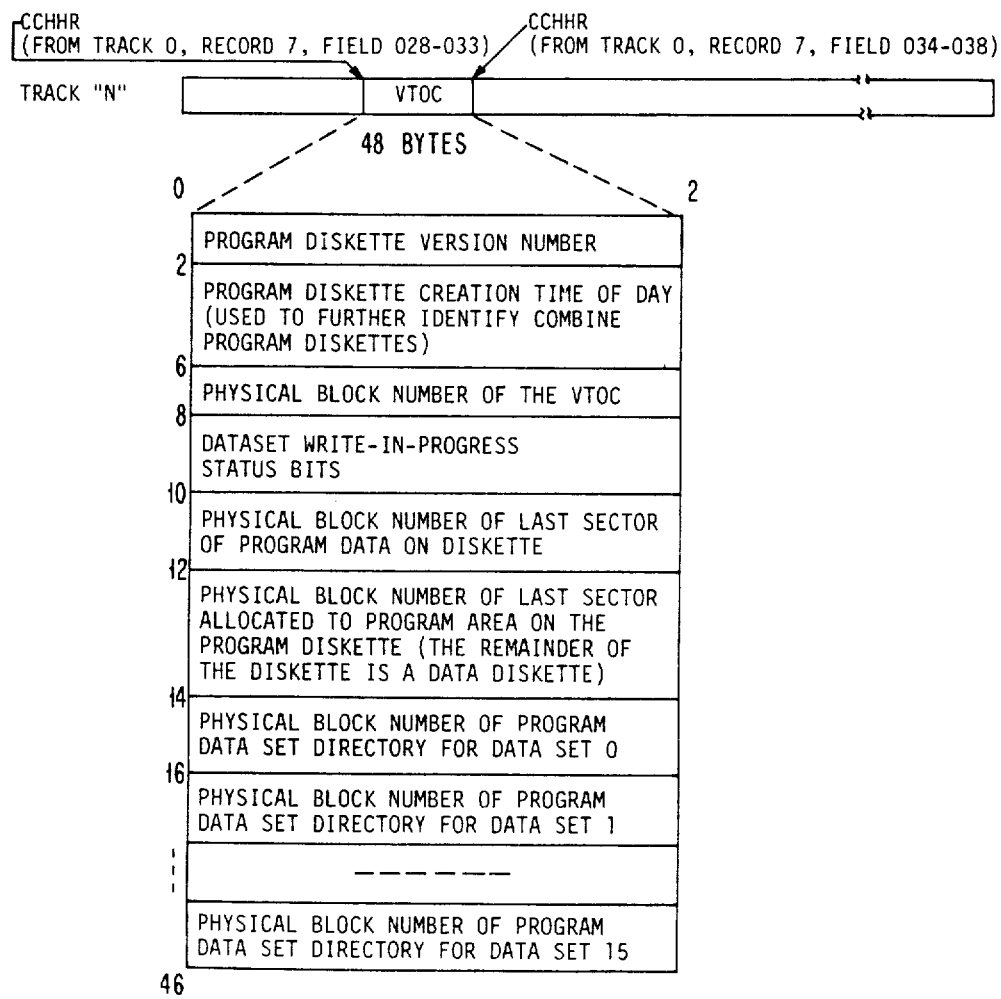
FIG. 4 illustrates the volume table of contents (VTOC) for a typical combine diskette employed in the system of FIG. 1.
Figure 6:
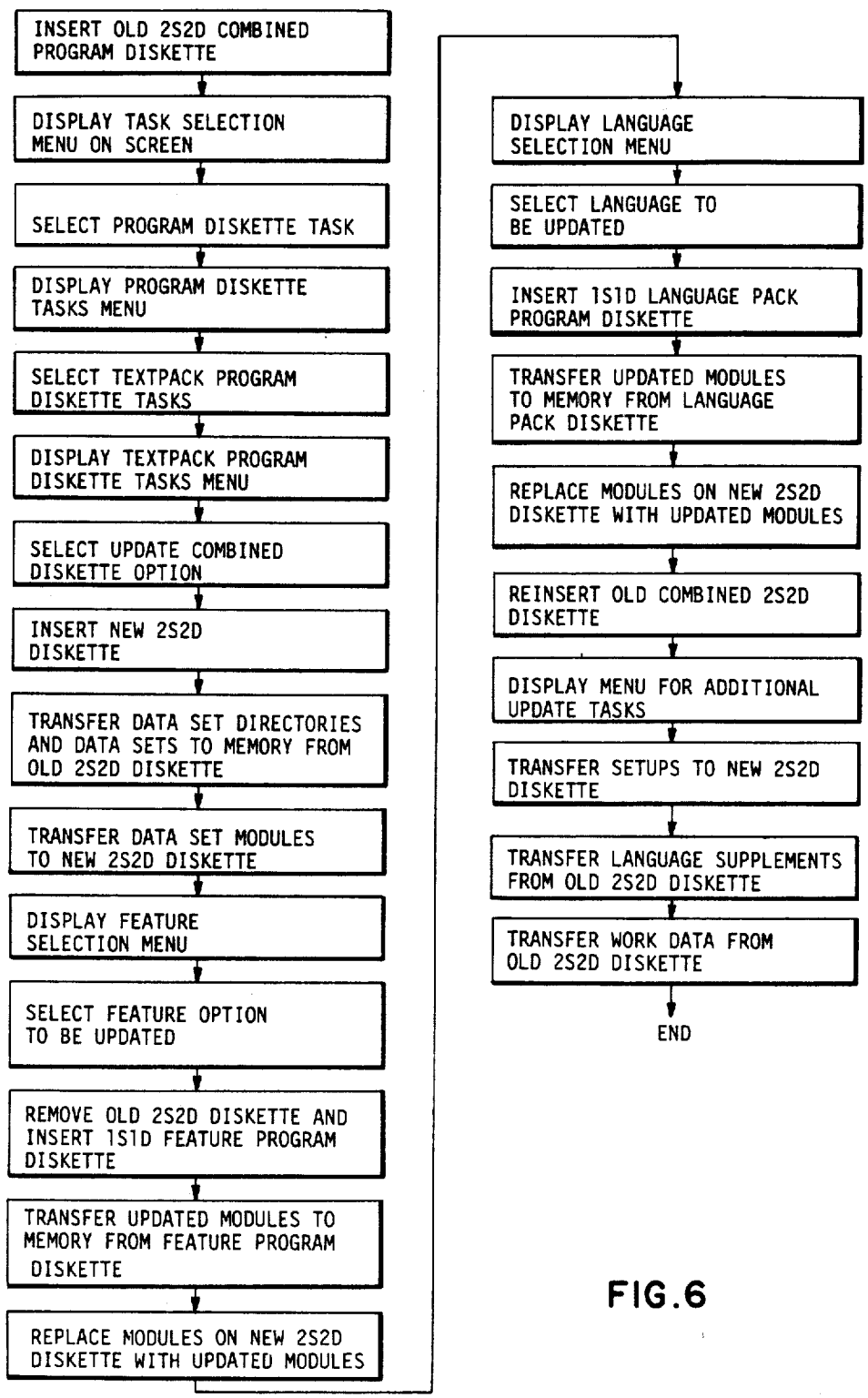
FIG. 6 is a flow chart illustrating the steps involved in the program being run by the microprocessor to update the combine program on the 2S2D diskette.

The volume table of contents VTOC is constructed by the user and, in this instance, is a table similar to FIG. 4 which contains a 2-byte pointer to the start of the storage location of each of 16 data set directories. The VTOC table also includes other relevant data about the diskette. As is conventional, the 2-byte pointer in VTOC to each data set directory is based on a physical block number (PBN) which is assigned sequentially to sectors beginning at track 1, sector 1 (physical block 0) through track 74, sector 15 (physical block 1110), as shown in FIG. 2.

FIG. 5 illustrates the format of a data set directory. Each directory includes a 2-byte physical block number pointer to each program module assigned to the data set. A data set is, therefore, just a collection of related program modules, which collection does not exceed 127 modules. The programs stored on the diskettes are divided among 16 different data sets where each data set represents a particular program function so that each module assigned to that data set performs a similar program function.

The system, as shown in FIG. 1, is activated by the operator turning on the power and inserting a basic text processing program diskette into one of the diskette drives 14L or 14R. The basic program diskette is an 1S1D type diskette and, since an 1S1D type diskette can be read by either device, either device may be used. The system automatically reads the appropriate sector of track 0 to initialize the system. This involves reading into the memory of the microprocessor the IPL program and programs for displaying menus and programs for causing the system to perform the tasks indicated by the menus or for directing the operator to other diskettes when the programs to accomplish the selected tasks are not on the operating diskette. After the system has been initialized, a task selection menu is displayed to the operator on display device 13 similar to the following.

MENU 1

| PRODSK | | Kyb 1 |
|---|---|---|
| | TASK SELECTION | |
| ID | ITEM | |
| a | Typing Tasks: | |
| | Create, Revise or Paginate Documents | |
| b | Work Diskette Tasks: | |
| | Delete or Duplicate Documents, Files, or Setups | |
| | Duplicate, Condense or Erase/Initialize (Name) Diskette, | |
| | Print Index of Diskette Contents, | |
| | Change Document or Diskette Name, | |
| | Recover Documents, Files and Setups | |
| c | Program Diskette Task: | |
| | Default Formats, Duplicate Setups, and Spelling Supplement | |
| | Printer and Work Station Description, | |
| | Duplicate and Erase Program Diskette | |
| | Feature Program Diskette Tasks | |
| | Create and Update Combined Program Diskette | |
| d | Spelling Tasks | |
| e | Feature Tasks | |
| f | Merge Tasks | |

MENU 1-continued (Instruction Line)
Type ID letter to choose ITEM; press ENTER:
(Message Line)

The top line of the menu contains a number of fields. The first field, for example, defines the name of the diskette, while other fields will be used to portray to the operator conditions of the system. The bottom three lines of the menu are an instruction line, a prompt line, and a message line respectively, which function as their names imply.

The tasks available to the operator and performed by the system, as shown in Menu 1, will now be described in a general sense to provide a basis for understanding the operation of the present system using 1S1D diskettes. Prior to such description, it should be recognized that the operator has available a number of diskettes. One group of diskettes will be program diskettes, a second group will be work diskettes, and a third group will be new blank diskettes which are blank except for the initialization information and formatting data that was recorded on the diskette at the factory.

Further, if the system has only one diskette drive which only operates with a 1S1D type diskette, all of the diskettes referred to above will be of the same density type, namely, 1S1D.

If, however, the system includes a 14L and a 14R 2S2D type diskette drive, then the operator will probably have two types of diskettes, i.e., a single and double density diskettes.

In addition, it should be understood that the operator will have two different types of program disks. One type of program disk is to the basic set of tasks that the system performs, while the other type of program disks are to specific features. It should be understood that only the basic program diskette has its own IPL program so that the operator may not insert a feature program diskette directly when the feature task is to be performed. The main program, however, will prompt the operator to insert and remove the feature diskette at the appropriate time in accordance with the interactive entry of data into the system in accordance with selected menu options.

The tasks that the operator may select are displayed on the display device as a result of the IPL operation. The function of these tasks are as follows:

Typing Task. This task is primarily concerned with the creation, revision or reformatting of documents that have been entered into the system. If the operator selects the typing tasks option in the task selection menu, then the typing task program set is loaded into the system from the diskette. If the program diskette has been taken out or is not in the work station diskette drive when this menu is displayed and the option selected, the system will display a message to the operator on the prompt line advising the operator to insert the particular diskette. After the typing task program set is loaded, the typing task selection menu is displayed, which resembles the following menu.

MENU 2

| DSK001 | | Kyb 1 |
|---|---|---|
| | TYPING TASKS | |
| ID | ITEM | |
| a | Create Document | |
| b | Revise Document | |
| c | Paginate Document | |

MENU 2-continued

| d | Paginate, Hyphenate, Spell Check Document |
| e | Go to Task Selection |

When finished with this menu, press ENTER.
Type ID letter to choose ITEM; press ENTER:
(Message Line)

Depending on the operator's response to this menu, a message to insert an appropriate work diskette will be displayed.

Work Diskette Tasks. A work diskette task is primarily directed to the maintenance of work diskettes and their contents. A work diskette is a diskette on which documents are stored, for example. If the operator selects the work diskette task option in the task selection menu (Menu 1), the work diskette task program set is loaded into the system. As before, if the program diskette has been removed from the system, the system will prompt the operator to reinsert the program diskette. After the work diskette task program set has been loaded, the following menu is presented to the operator.

MENU 3

| DSK001 | | Kyb 1 |
|---|---|---|
| | WORK DISKETTE TASKS | |
| ID | ITEM | |
| a | Delete Document | |
| b | Duplicate Document | |
| c | Change Document Name | |
| d | Change Diskette Name | |
| e | Duplicate Diskette | |
| f | Condense Diskette | |
| g | Erase or Initialize (Name) Diskette | |
| h | Recover Documents | |
| i | Print Index of Diskette Contents | |
| j | Go to Task Selection | |

(Instruction line)
(Prompt line)
(Message line)

Program Diskette Tasks. When the program diskette task option is selected on Menu 1, the system response will be to prompt the operator to insert the appropriate program diskette. After the diskette is inserted, it is checked to insure it has the correct maintenance level, menu language etc. If the check is satisfied, the program diskette task program set is loaded into the system. This set of tasks is directed primarily to maintenance of program diskettes and their contents. When the program diskette tasks selection set has been loaded into the system, a program diskette task selection menu such as the one shown below is displayed to the operator.

MENU 4

| PRODSK | | Kyb 1 |
|---|---|---|
| | TEXTPACK PROGRAM DISKETTE TASKS | |
| ID | ITEM | |
| a | Change Document Format Defaults | |
| b | Change Alternate Format Defaults | |
| c | Change Printer Description | |
| d | Change Work Station Description | |
| e | Duplicate Machine Setup | |
| f | Duplicate Program Diskette | |
| g | Erase Program Diskette | |
| h | Duplicate Spelling Supplement | |
| i | Change Arithmetic Format Defaults | |
| j | Create New Combined Program Diskette | |
| k | Update Combined Program Diskette | |
| l | Go to Task Selection | |

When finished with this menu, press ENTER.
Type ID letter to choose ITEM; press ENTER:

MENU 4-continued (Message Line)

If a feature program diskette is loaded, then the specific program diskette task selection menu on that feature diskette is displayed after the feature program task set is transferred into the system. The menu details will depend on the feature.

Spelling Tasks. If the operator selects the spelling tasks option from the task selection menu (Menu 1), the spelling tasks program set is loaded into the system. As before, a message will be provided to the operator if the program diskette had been removed. The primary function of the spelling task is to check the spelling of words in a document. After the program set has been loaded into the system, the spelling task selection menu shown below is displayed to the operator.

MENU 5

| DSK001 | | Kyb 1 |
|---|---|---|
| | SPELLING TASKS | |
| ID | ITEM | |
| a | Check Document | |
| b | Load Supplement | |
| c | Clear Supplement | |
| d | Store Supplement on Program Diskette | |
| e | Choose Spelling Language Dictionary | |
| f | Paginate, Hyphenate, Spell Check Document | |
| g | Go to Task Selection | |

When finished with this menu, press ENTER.
Type ID letter to choose ITEM; press ENTER:
(Message Line)

Feature tasks. The function of the feature tasks option is to provide a mechanism whereby the operator may select certain specific operations to be performed in the system. Each of these operations will be on a separately distributed feature diskette and, hence, the response to the operator selecting the feature task option on the task selection menu (Menu 1) will always be to insert the appropriate feature diskette. After the feature program diskette has been loaded, it is checked to insure that it has the correct maintenance level and menu languages. The specific feature task selection menu on that feature diskette is displayed after the feature program task set is transferred to the system. The menu will depend on the specific feature.

The above description of the insertion and removal of diskettes is merely an example of the type of problems that the invention described in related application Ser. No. 311,083 is directed to.

As described in detail in that application, various programs are combined onto the 2S2D destination diskette in accordance with a "Combine" program that is entered into the system from a 1S1D source diskette which, in practice, has been packaged as part of the highest version of the basic program. The "Combine" program guides the operator interactively through a sequence of menus from which selections are made, and also prompts the operator to insert and remove specifically identified 1S1D diskettes at the appropriate time so that task program sets corresponding to the tasks selected from the displayed menus will be transferred to the 2S2D destination diskette and so that the appropriate housekeeping data will also be generated by the system and stored on the 2S2D diskette so as to permit the transferred programs to be subsequently selected and entered into the system from the single 2S2D "Combine" program diskette.

The 2S2D "Combine" program diskette is also used as a work diskette since, from a practical standpoint, the subset of selected task programs for a given text processing application does, in most situations, leave considerable amount of working storage space on the 2S2D combined diskette.

The method by which the 2S2D "Combine" diskette can subsequently be updated to reflect a change that has been made to one or more programming modules of a program that was previously distributed will now be described.

It is assumed for purposes of the following description, that the operator has been operating the system with a 2S2D combined program diskette that was created in accordance with the method described in the cross-referenced application and that that programming diskette was also employed as a work diskette.

It is further assumed that the operator has also received an updated copy of a feature program on a 1S1D diskette and that the operator wants to update the corresponding feature program on the 2S2D combined programming/work diskette.

The combined 2S2D diskette is initially inserted into device 14L and the basic or textpack program diskette task menu is displayed as shown below in response to the operator having selected the program diskette task option from the task selection menu (Menu 1) and subsequently, textpack program diskette task option from the program diskette task menu (not shown).

MENU 6

| PRODSK | Kyb 1 |
|---|---|
| TEXTPACK PROGRAM DISKETTE TASKS | |
| ID ITEM | |
| a Change Document Format Defaults | |
| b Change Alternate Format Defaults | |
| c Change Printer Description | |
| d Change Work Station Description | |
| e Duplicate Machine Setup | |
| f Duplicate Program Diskette | |
| g Erase Program Diskette | |
| h Duplicate Spelling Supplement | |
| i Change Arithmetic Format Defaults | |
| j Create New Combined Program Diskette | |
| k Update Combined Program Diskette | |
| l Go to Task Selection | |
| When finished with this menu, press ENTER. | |
| Type ID letter to choose ITEM; press ENTER. | |
| (Message Line) | |

When the operator selects option k from the menu, the "Update" program is read in and the system branches to the "Update" program. The overall function of the "Update" program is to make a copy of the 2S2D combined program diskette on a new 2S2D diskette except for the program modules which correspond to the updated modules on the 1S1D diskette. These modules replace the old modules on the new 2S2D diskette.

The "Update" program which, in the preferred embodiment, is part of the "Combine" program as mentioned in the cross-referenced application, guides the operator through the removal and insertion of the three diskettes involved at the appropriate times in accordance with the operator's response to displayed menu options so that, at the completion of the process, a new 2S2D combined program/work diskette exists which is logically identical to the original 2S2D combined program/work diskette except for certain program modules which were modified to reflect the changes present on the newly distributed 1S1D feature program diskette.

The process of creating the new combined 2S2D program/work diskette from the old combined 2S2D program/work diskette and the 1S1D updated feature diskette also functions to record all the program modules associated with the data set immediately following the data set directory and to also record all of the data set directories in a sequential fashion. Therefore, when a sequence of modules are loaded from a data set on the 2S2D combined program diskette, the loading process requires less time since substantially all of the modules will be transferred with a continuous read operation.

The process, therefore, begins by reading in the old 2S2D program diskette, displaying the initial task selection menu 1 from which the operator selects option c, i.e., program diskette tasks, and has presented on the screen the program diskette task menu (not shown) from which the operator selects option a, i.e., textpack program diskette tasks, and has presented on the screen the textpack program diskette task menu 6. The operator selects option k from menu 6, namely, Update Combine Program Diskette task, which causes the combine program task set stored on the 2S2D diskette to be transferred into memory. The combine program task set includes the necessary subroutines to cause the system to create the new 2S2D diskette from the old 2S2D diskette and the new 1S1D updated feature program diskette.

If the operator has not previously inserted a new factory initialized 2S2D blank diskette into the other diskette drive 14R, the system prompts the operator for that action and then checks to insure that an appropriate program diskette has been loaded. The volume table of contents corresponding to the old 2S2D diskette is transferred to the new 2S2D diskette. As discussed previously, the VTOC includes a 2-byte pointer to each data set directory. Therefore, the system determines the physical block number of data set 0 directory, and this is transferred into the memory from the old 2S2D diskette. However, the physical block numbers, as stored in memory, will be different because the contents of the directory are employed by the update program to transfer to the new 2S2D diskette in sequential order all modules assigned to data set 0 on the old 2S2D diskette. Those modules assigned to data set 0 are recorded in sequential blocks on the new 2S2D diskette and the starting block number of each module is computed and stored in the data set directory 0 in memory for the 2S2D updated diskette.

The next step of the process is to transfer the remaining data set directories to memory and the program modules assigned thereto in sequential order from the old combine diskette to the new combine diskette.

After all the data set directories have been updated in memory and their respectively identified programming modules have been transferred to the new 2S2D diskette, the system displays the feature menu which has been dynamically created. Cross-referenced application Ser. No. 311,088 describes in detail how the feature menu is dynamically created.

MENU 7

| XXXXXX YYYYYY | | | Kyb 1 |
|---|---|---|---|
| | COMBINE FEATURE SELECTION | | |
| ID ITEM | | CHOICE | CHOICES |

MENU 7-continued

| | | | |
|---|---|---|---|
| a | Asynchronous Feature | 2 | 1 = From Diskette Type 1<br>2 = Do Not Combine |
| b | Binary Synchronous Feature | 2 | 1 = From Diskette Type 1<br>2 = Retain from 2D |
| c | Filepack Feature | 2 | 1 = From Diskette Type 1<br>2 = Retain from 2D |
| d | Mag Card Feature | 2 | 1 = From Diskette Type 1<br>2 = Do Not Combine |

When finished with this menu, press ENTER.
(Prompt Line)
(Message Line)

When the operator selects the feature, the system prompts the operator to insert the newly received 1S1D diskette containing the feature program corresponding to the option selected on the feature menu.

The displayed feature menu is similar to Menu 7 shown above where all potential system features are listed. The operator is given two possible choices, i.e., #1 or #2. The first choice, #1 "From Diskette Type 1" is selected by the operator when the corresponding feature program is to be updated. The default choice is #2. Choice #2 is either "Do Not Combine" or "Retain from 2D", depending on whether the feature program is stored on the 2S2D diskette. Choice #1, of course, will only be selected by the operator when Choice #2 indicates that the feature program is, in fact, stored on the disk and is to be replaced (updated) from the 1S1D diskette.

The term "update" as used in the present description is limited to the situation where the update involves replacing one program module with another module having the same 16-bit designation. However, the build number as recorded in the last portion of the data set directory for the updated module will be greater than the previous build number, as shown in FIG. 5.

Since the data set directories for the newly issued 1S1D feature program will identify the programming modules by data set number, module number, and build number, a comparison is made to determine what program modules in each data set have build numbers which are higher than the build numbers of the corresponding modules already recorded. Different criteria for a change in the build number of a module are possible provided that once established, they do not change. For example, when the new 1S1D diskette is issued, each of the programming modules on that diskette may be issued a new build number. Alternately, only those modules that have been changed are issued new build numbers while the remaining modules on the 1S1D diskette which have not been altered keep their assigned build number. When a module having a higher build number is detected, that module is then recorded over the old module if the length of the new module does not exceed the length of the old module. Otherwise, if the length is greater, the new module is recorded immediately following the last module recorded on the 2S2D diskette and its location, i.e., physical block number, is inserted in the directory in place of the old physical block number. While the old module is not erased, it will not be read since the directory no longer points to the module, but merely its replacement. Where the build numbers of corresponding modules are the same, no change is made on the new 2S2D diskette. Also, if the build number on the 2S2D diskette module is greater or the same as the build number on the 1S1D diskette module, no change is made.

Next the following menu is employed by the operator to indicate the specific set of language modules to be updated.

MENU 8 xxxxxx yyyyyy      Kyb 1

COMBINE LANGUAGE SELECTION

| ID | LANGUAGE | CHOICE | CHOICES |
|---|---|---|---|
| a | U.S. English | 2 | 1 = From 1D<br>2 = Retain From 2D |
| b | U.K. English | 2 | 1 = From 1D<br>2 = Do Not Combine |
| c | German | 2 | 1 = From 1D<br>2 = Retain From 2D |
| 1 | Norwegian | 2 | 1 = From 1D<br>2 = Do Not Combine |

When finished with this menu, press ENTER.
(Prompt Line)
(Message Line)

The above menu is displayed to the operator after completion of the update of any feature programs. As with the feature menu, all potential language options have been listed and the #2 choice indicates to the operator if the particular language program has previously been transferred to the 2S2D diskette by the message "Retain From 2D".

In this instance, U.S. English and the German language programs are recorded on the 2S2D diskette. Assuming that the new 1S1D diskette is an update for the German language dictionary, then the operator changes the default option in the "Your Choice" column from #2 to #1. The system would then prompt the operator to insert the 1S1D diskette containing the German language and the program modules recorded thereon would be transferred to the 2S2D diskette in the same manner as described in connection with the transfer of programming modules from the feature diskette.

After the update feature and language program modules have been transferred, the respective updated directories are recorded on the new 2S2D diskette from memory and then the system prompts the operator to reinsert the old combined 2S2D diskette in order to transfer the information remaining on that diskette which could comprise both program setups and language supplements and work data such as documents which are in various stages of processing. This latter information is merely transferred as a logical copy by the "update" program which insures that the appropriate tables on the new 2S2D diskette are updated reflecting the location on the new 2S2D diskette of this data.

If desired, the update option can be used to add a new feature or a new language to the 2S2D combine diskette that previously had not been transferred, rather than employing the create combine option.

While the invention has been particularly shown and described with reference to a preferred embodiment thereof, it will be understood by those skilled in the art that various other changes in the form and details may be made therein without departing from the spirit and scope of this invention.

Having thus described our invention, what we claim as new and desire to secure by Letters Patent is:

1. A method to assist the operator of an interactive text processing system to update a selected one of a plurality of text processing task programs each of which is stored on a "combined-program" diskette as a plurality of programming modules, with each module assigned to one of a plurality of sequentially numbered data sets and each further identified by a unique identifier including a portion which can identify a module which is a later revision, from a previous module, said "combined-program" diskette further including control programs to cause said text processing system to transfer program modules on said "combined-program" diskette to a new diskette and to cause said system to interact with said operator in the selection of said one selected text processing task program and the updating of said one selected text processing task programs from a revised program stored on a separate diskette, said system including a keyboard to permit interaction with said system by said operator, a display screen to permit interaction by said system with said operator, a microprocessor having a memory and at least one diskette drive for transferring data between a diskette in said drive and said memory, said method comprising;

(a) inserting said "combined-program" diskette into said diskette drive and transferring one of said control programs into said system in response to operation of said keyboard by said operator, (b) executing said one control program to cause said system to display a menu to said operator which includes an update option that allows said selected one of said text processing task programs to be updated by replacing one or more of its programming modules with modules having later revisions stored on said separate diskette, (c) operating said keyboard while said menu is displayed to select said update option to cause an update control program to be transferred to said system from said "combined-program" diskette, (d) executing said update control program to cause said system to display another menu to said operator which includes a plurality of options to permit said operator to identify to said system said selected one text processing task program to be updated, (e) operating said keyboard while said another menu is displayed to identify to said system said selected one text processing task program to be updated, (f) further executing said update program to transfer:

(1) each said module from said "combined-program" diskette to said memory, (2) and each module transferred in step (1) to said new diskette so that said transferred modules are stored sequentially on said new diskette in data set sequence and sequentially within each said data set by said unique identifiers, (g) displaying to said operator at the end of the preceding step an instruction to insert said separate program diskette into said drive, (h) inserting said separate program diskette into said drive and while said instruction is still being displayed operating said keyboard to advise said system said separate diskette has been inserted, (i) transferring to memory from said separate program diskette each of the programming modules which collectively represent the revised version of the text processing task program being updated, (j) comparing with said microprocessor said unique identifiers of the modules transferred from said separate program diskette to the unique identifiers of the corresponding modules transferred from said "combined-program" diskette and identifying those modules that have been revised, and (k) recording said revised modules on said new diskette in place of said corresponding modules and at corresponding locations on said new diskette.

2. The method recited in claim 1 in which said plurality of options displayed on said another menu in step (d) each include a message that enables said operator to determine if said text processing task program associated with said option was stored on said "combined-program" diskette.

3. The method recited in claim 2 in which said "combined-program" diskette has stored thereon additional information associated with at least one of said text processing task programs and further comprises the steps of interactively transferring said additional information to said new diskette as a logical copy under the control of said update control program.

4. The method recited in claim 3 in which said additional information comprises program "set-up" information for said at least one text processing task program.

* * * * *